(12) United States Patent
Kato et al.

(10) Patent No.: US 8,807,746 B2
(45) Date of Patent: Aug. 19, 2014

(54) SPECTACLE LENS, SPECTACLES, AND METHOD FOR MANUFACTURING SPECTACLE LENS

(75) Inventors: Kazutoshi Kato, Kamiina-gun (JP); Ayumu Ito, Minowa-machi (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 81 days.

(21) Appl. No.: 13/270,154

(22) Filed: Oct. 10, 2011

(65) Prior Publication Data

US 2012/0086910 A1    Apr. 12, 2012

(30) Foreign Application Priority Data

Oct. 12, 2010  (JP) .................................. 2010-229316
Oct. 12, 2010  (JP) .................................. 2010-229317
Apr. 8, 2011   (JP) .................................. 2011-086066

(51) Int. Cl.
     *G02C 7/06*       (2006.01)
(52) U.S. Cl.
     USPC ............. 351/159.41; 351/159.42; 351/159.43
(58) Field of Classification Search
     USPC ................ 351/159.03–159.1, 159.12–159.14
     See application file for complete search history.

(56) References Cited

U.S. PATENT DOCUMENTS

| | | | | |
|---|---|---|---|---|
| 5,926,250 A | 7/1999 | Mukaiyama et al. | ......... | 351/168 |
| 6,019,470 A | 2/2000 | Mukaiyama et al. | ......... | 351/169 |
| 6,074,062 A * | 6/2000 | Morris et al. | ............ | 351/159.42 |
| 6,142,624 A | 11/2000 | Morris et al. | ................. | 351/159 |
| 6,682,193 B1 | 1/2004 | Morris et al. | ................. | 351/163 |
| 6,817,713 B2 | 11/2004 | Ueno | ............................. | 351/177 |
| 7,275,822 B2 | 10/2007 | Gupta et al. | .................... | 351/177 |
| 2004/0075803 A1* | 4/2004 | Yamamoto | ...................... | 351/41 |
| 2006/0146280 A1* | 7/2006 | Gupta et al. | .................. | 351/168 |
| 2006/0203193 A1* | 9/2006 | Kato | ............................. | 351/177 |
| 2008/0273170 A1 | 11/2008 | Watanabe | | |
| 2010/0195044 A1* | 8/2010 | Collins et al. | ................. | 351/161 |

FOREIGN PATENT DOCUMENTS

| | | |
|---|---|---|
| EP | 0809127 A1 | 11/1997 |
| EP | 1767983 A1 | 3/2007 |
| JP | 2002-202482 | 7/2002 |
| JP | 2005202130 A | 7/2005 |
| JP | 3852116 | 9/2006 |
| WO | WO 00/04414 A1 | 1/2000 |
| WO | 2005091054 A1 | 9/2005 |

OTHER PUBLICATIONS

Rayner, "Aniseikonia and Magnification in Ophthalmic Lenses, Problems and Solutions" American Journal of Optometry and Archives of American Academy of Optometry, vol. 43, No. 10, pp. 623-632, Oct. 1, 1996.

(Continued)

*Primary Examiner* — Ricky Mack
*Assistant Examiner* — William Alexander
(74) *Attorney, Agent, or Firm* — DLA Piper LLP (US)

(57) ABSTRACT

Spectacle lenses that allow a wearer to view an object in a more comfortable manner include a pair of lenses for the left and right eyes. The power of one of the pair of lenses is shifted toward the positive side with respect to the power of the other lens, and object-side average surface power (base curve) of the one lens is smaller than object-side average surface power (base curve) of the other lens. The power (dioptric power) is principal meridian power along a principal meridian of each of the lenses, and the base curve is in the direction along the principal meridian.

6 Claims, 12 Drawing Sheets

(56) References Cited

OTHER PUBLICATIONS

Stephens et al., "New Options for Aniseikonoa Correction: The Use of High Index Materials" Optometry and Vision Science, vol. 68, No. 11, pp. 899-906, Nov. 1, 1991.

Achiron et al., "The Use of Dissimilar Progressives in the Management of Presbyopia" Survey of Ophthalmology, vol. 43, No. 3, pp. 275-279, Dec. 1, 1998.

Extended European search report dated Jun. 28, 2012 issued in European application 11179273.5 cites the U.S. patent, foreign patent documents and non-patent literature above.

* cited by examiner

FIG. 4A

| | BASE CURVE Db1 (D) | RADIUS OF CURVATURE (mm) | REFRACTIVE INDEX n | CENTRAL THICKNESS t (m) | L (m) | POWER P (D) | MAGNIFICATION M | MAGNIFICATION RATIO |
|---|---|---|---|---|---|---|---|---|
| FOR RIGHT EYE (R) | 7.500 | 80.00 | 1.60 | 0.0068 | 0.012 | 6.00 | 1.1131 | 0.9943 |
| FOR LEFT EYE (L) | 7.250 | 82.76 | 1.60 | 0.0065 | 0.012 | 5.75 | 1.1067 | |

FIG. 4B

| | BASE CURVE Db1 (D) | RADIUS OF CURVATURE (mm) | REFRACTIVE INDEX n | CENTRAL THICKNESS t (m) | L (m) | POWER P (D) | MAGNIFICATION M | MAGNIFICATION RATIO |
|---|---|---|---|---|---|---|---|---|
| FOR RIGHT EYE (R) | 7.500 | 80.00 | 1.60 | 0.0068 | 0.012 | 6.00 | 1.1131 | 1.0000 |
| FOR LEFT EYE (L) | 8.614 | 69.65 | 1.60 | 0.0065 | 0.012 | 5.75 | 1.1131 | |

FIG. 4C

| | BASE CURVE Db1 (D) | RADIUS OF CURVATURE (mm) | REFRACTIVE INDEX n | CENTRAL THICKNESS t (m) | L (m) | POWER P (D) | MAGNIFICATION M | MAGNIFICATION RATIO |
|---|---|---|---|---|---|---|---|---|
| FOR RIGHT EYE (R) | 6.192 | 96.90 | 1.60 | 0.0068 | 0.012 | 6.00 | 1.1067 | 1.0000 |
| FOR LEFT EYE (L) | 7.250 | 82.76 | 1.60 | 0.0065 | 0.012 | 5.75 | 1.1067 | |

FIG. 5A

| | BASE CURVE Db1 (D) | RADIUS OF CURVATURE (mm) | REFRACTIVE INDEX n | CENTRAL THICKNESS t (m) | L (m) | POWER P (D) | MAGNIFICATION M | MAGNIFICATION RATIO |
|---|---|---|---|---|---|---|---|---|
| FOR RIGHT EYE (R) | 5.500 | 90.91 | 1.50 | 0.0048 | 0.012 | 4.00 | 1.0692 | 0.9839 |
| FOR LEFT EYE (L) | 5.500 | 90.91 | 1.50 | 0.0038 | 0.012 | 3.00 | 1.0520 | |

FIG. 5B

| | BASE CURVE Db1 (D) | RADIUS OF CURVATURE (mm) | REFRACTIVE INDEX n | CENTRAL THICKNESS t (m) | L (m) | POWER P (D) | MAGNIFICATION M | MAGNIFICATION RATIO |
|---|---|---|---|---|---|---|---|---|
| FOR RIGHT EYE (R) | 5.500 | 90.91 | 1.50 | 0.0048 | 0.012 | 4.00 | 1.0692 | 0.9864 |
| FOR LEFT EYE (L) | 6.500 | 76.92 | 1.50 | 0.0038 | 0.012 | 3.00 | 1.0547 | |

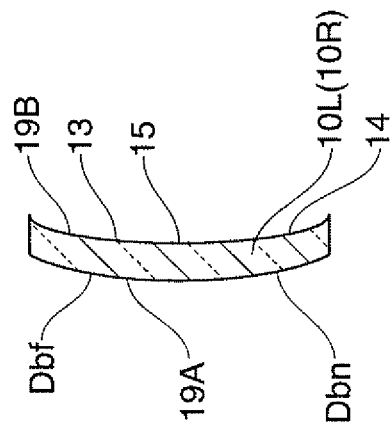
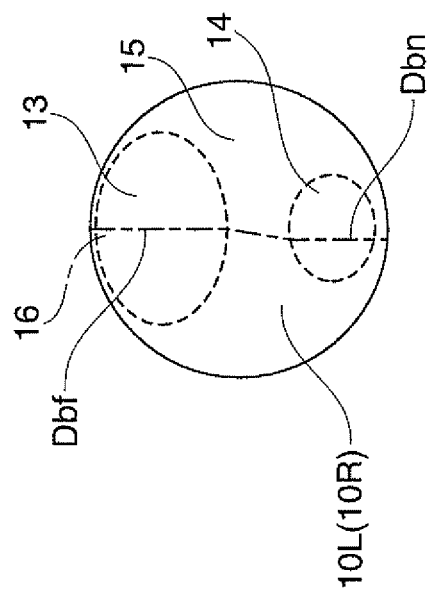
FIG. 7A
FIG. 7B

FIG. 9A

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 7.0 | 1.662 | 0.004 | 0.012 | 3 | 1.055 |
| FOR LEFT EYE (L) | 6.0 | 1.662 | 0.004 | 0.012 | 4 | 1.066 |
| | | | | | MAGNIFICATION RATIO | 1.010 |

FIG. 9B

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 6.0 | 1.662 | 0.003 | 0.012 | 3 | 1.049 |
| FOR LEFT EYE (L) | 7.0 | 1.662 | 0.004 | 0.012 | 4 | 1.068 |
| | | | | | MAGNIFICATION RATIO | 1.019 |

FIG. 10A

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 2.5 | 1.498 | 0.001 | 0.012 | -4 | 0.956 |
| FOR LEFT EYE (L) | 4.0 | 1.498 | 0.001 | 0.012 | -4.25 | 0.954 |
| | | | | | MAGNIFICATION RATIO | 0.998 |

FIG. 10B

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 2.5 | 1.498 | 0.001 | 0.012 | -4 | 0.956 |
| FOR LEFT EYE (L) | 2.5 | 1.498 | 0.001 | 0.012 | -4.25 | 0.953 |
| | | | | | MAGNIFICATION RATIO | 0.997 |

FIG. 11A

DISTANCE PORTION

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 6.0 | 1.6 | 0.003 | 0.012 | 2 | 1.036 |
| FOR LEFT EYE (L) | 6.0 | 1.6 | 0.003 | 0.012 | 2 | 1.036 |
| | | | | | MAGNIFICATION RATIO | 1.000 |

NEAR PORTION

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 7.0 | 1.6 | 0.003 | 0.012 | 4 | 1.064 |
| FOR LEFT EYE (L) | 6.0 | 1.6 | 0.003 | 0.012 | 5 | 1.076 |
| | | | | | MAGNIFICATION RATIO | 1.011 |

FIG. 11B

NEAR PORTION

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 6.0 | 1.6 | 0.003 | 0.012 | 4 | 1.062 |
| FOR LEFT EYE (L) | 6.0 | 1.6 | 0.003 | 0.012 | 5 | 1.076 |
| | | | | | MAGNIFICATION RATIO | 1.013 |

FIG. 11C

DISTANCE PORTION

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 5.0 | 1.6 | 0.003 | 0.012 | 2 | 1.034 |
| FOR LEFT EYE (L) | 6.0 | 1.6 | 0.003 | 0.012 | 2 | 1.036 |
| | | | | | MAGNIFICATION RATIO | 1.002 |

NEAR PORTION

| | BASE CURVE Dbf (D) | REFRACTIVE INDEX n | CENTRAL THICKNESS t (m) | L (m) | POWER P (D) | MAGNIFICATION M |
|---|---|---|---|---|---|---|
| FOR RIGHT EYE (R) | 5.0 | 1.6 | 0.003 | 0.012 | 4 | 1.060 |
| FOR LEFT EYE (L) | 6.0 | 1.6 | 0.003 | 0.012 | 5 | 1.076 |
| | | | | | MAGNIFICATION RATIO | 1.015 |

SPECTACLE LENS, SPECTACLES, AND METHOD FOR MANUFACTURING SPECTACLE LENS

CROSS-REFERENCE TO RELATED APPLICATIONS

This application claims the benefit of priority under 35 USC 119 of Japanese application 2010-229316, filed on Oct. 12, 2010, Japanese application 2010-229317, filed on Oct. 12, 2010, and Japanese application 2011-086066, filed on Apr. 8, 2011, which are incorporated herein by reference.

BACKGROUND

1. Technical Field

The present invention relates to spectacle lenses formed of a pair of lenses for left and right eyes, spectacles, and a method for manufacturing the spectacle lenses.

2. Related Art

JP-A-2002-202482 discloses a method for designing and manufacturing left and right spectacle lenses that form spectacles based on different prescriptions including dioptric power of left and right eyes in such a way that optical performance is ensured within an acceptable range and the appearance of the lenses is ensured to be good-looking at the same time. In the method, when the difference between the prescriptions including dioptric power of the left and right eyes is greater than or equal to a predetermined value, lens design is so performed that balanced binocular vision is achieved by designing the curvatures of first and second curved refraction surfaces of each of the left and right spectacle lenses in such a way that not only do the left and right spectacle lenses satisfy the respective prescriptions including dioptric power and does optical performance of each of the lenses falls within an acceptable range but also the curvatures of the first and second curved refraction surfaces of at least one of the left and right spectacle lenses are so selected that the difference in the curvature of the first curved refraction surface between the left and right spectacle lenses falls within a predetermined range.

A spectacle lens is selected, designed, and/or manufactured from a variety of viewpoints in accordance with states and/or specifications of a user (wearer). In recent years, even a commercially available plastic lens has a high refractive index ranging from 1.6 to 1.7, and a plastic lens having a higher refractive index is being developed. Further, an aspheric surface is introduced to correct aberrations in a more satisfactory manner, whereby even a plastic lens having large power (dioptric power) is not very thick (a peripheral portion of a lens is not very thick) and aberrations are well corrected. The thus designed spectacles fit well to a wearer and allow the wearer to view an object in a satisfactory manner. There is, however, a demand to provide spectacles that allow the wearer to view an object in a more satisfactory manner.

SUMMARY

An advantage of some aspects of the invention is to solve at least part of the problems described above and the invention can be implemented in the following forms or application examples.

Application Example 1

An aspect of the invention is directed to spectacle lenses (lens system) including first and second lenses. Power of the second lens is shifted toward a positive side with respect to power of the first lens, and object-side average surface power of the second lens is smaller than object-side average surface power of the first lens.

Spectacle lenses are paired and used for the left and right eyes. The pair of spectacle lenses have been, however, separately adjusted in related art and so designed or selected that one lens is suitable to compensate (correct) the left eyesight and the other lens is suitable to compensate right eyesight. In contrast, when spectacle lenses are designed and/or manufactured in accordance with the invention, the lenses for the left and right eyes are coordinately designed from the viewpoint of good appearance and vision compensation.

For example, to perform lens design for correcting astigmatism and satisfying other lens performance on a lens basis, design based on a Tscherning ellipse is performed. When the magnitudes of power (dioptric power) of left and right lenses differ from each other, the lens having power shifted toward the positive side has, in accordance with a Tscherning ellipse, a greater object-side average surface power (base curve) than the lens having power shifted toward the negative side. When the magnitudes of object-side average surface power of the left and right lenses differ from each other, the magnifications thereof differ from each other. As a result, separately (independently) selecting lenses suitable for left and right vision compensation disadvantageously results in different sizes of left and right images produced through the compensated vision.

To address the problem, in the above aspect of the invention, when the magnitudes of power of a pair of left and right lenses differ from each other in spectacle prescriptions, the magnitudes of object-side average surface power of lenses are so coordinately designed that the difference in magnification between the lenses is reduced. In this case, the lenses are designed oppositely to the guidance of a Tscherning ellipse. That is, when the power of one of the lenses is shifted toward the positive side with respect to the power of the other lens, the object-side average surface power of the one lens having power shifted toward the positive side is set to be smaller than the object-side average surface power of the other lens. Lenses that allow the difference between the sizes of object images produced through the compensated left and right vision to be reduced and the left and right images to be readily merged into a single image are thus provided.

Application Example 2

In the spectacle lenses described above, it is typical that the power of the second lens is principal meridian power along a principal meridian of the second lens; the object-side average surface power of the second lens is average surface power in the direction along the principal meridian of the second lens; the power of the first lens is principal meridian power along a principal meridian of the first lens; and the object-side average surface power of the first lens is average surface power in a direction along the principal meridian of the first lens. When one of the left and right lenses or the other one thereof or both the left and right lenses are designed to compensate astigmatism, any of the lenses for correcting astigmatism has two different magnitudes of principal meridian power. In spectacle lenses, reducing average surface power in the direction along a principal meridian of one of the spectacle lenses that has principal meridian power shifted toward the positive side allows the difference in size between object images produced through the compensated left and right vision to be reduced even in the spectacle lenses for correcting astigmatism.

Lenses that allow left and right images to be readily merged into a single image are thus provided.

Application Example 3

When a pair of lenses are so designed that the difference in magnification between the lenses is minimized, the eyeball-side surface of each of the lenses possibly becomes flat or convex. A spectacle lens is preferably a meniscus lens convex toward an object, for example, in consideration of a situation where the spectacle lens is worn. It is therefore desirable to set the object-side average surface power of a lens having power shifted toward the positive side to be smaller than the object-side average surface power of the other lens to the extent that the first and second lenses are each a meniscus lens convex toward an object.

Application Example 4

Another aspect of the invention is directed to spectacle lenses (lens system) including first and second lenses, each lens including a distance portion and a near portion. The dioptric power of the distance portion of the second lens is shifted toward a positive side with respect to the dioptric power of the distance portion of the first lens, and object-side average surface power of the distance portion of the second lens is smaller than object-side average surface power of the distance portion of the first lens.

Spectacle lenses are paired and used for the left and right eyes. The pair of lenses have been, however, separately adjusted in related art and so designed or selected that one lens is suitable to compensate (correct) the left eyesight and the other lens is suitable to compensate right eyesight, and even that each lens has a distance portion suitable to compensate distance vision and a near portion suitable to compensate near vision. In contrast, when spectacle lenses are designed and/or manufactured in accordance with the invention, the lenses for the left and right eyes are coordinately designed from the viewpoint of good appearance and vision compensation.

For example, to perform lens design for correcting astigmatism and satisfying other lens performance on a lens basis, design based on a Tscherning ellipse is performed. When the magnitudes of power (dioptric power) of left and right lenses differ from each other, the lens having dioptric power shifted toward the positive side has, in accordance with a Tscherning ellipse, a greater object-side average surface power (average curvature, base curve) than the lens having dioptric power shifted toward the negative side. When the magnitudes of average surface power of the left and right lenses differ from each other, the magnifications thereof differ from each other. As a result, separately (independently) selecting lenses suitable for left and right vision compensation disadvantageously results in different sizes of left and right images produced through the compensated vision.

To address the problem described above, in the above aspect of the invention, specifications of the left and right lenses on distance vision are coordinately designed, or the left and right lenses are designed oppositely to the guidance of a Tscherning ellipse. That is, when the dioptric power of the distance portion of one of the lenses is shifted toward the positive side with respect to the dioptric power of the distance portion of the other lens, the object-side average surface power of the distance portion of the one lens, the distance portion of which has dioptric power shifted toward the positive side, is set to be smaller than the object-side average surface power of the distance portion of the other lens. Lenses that allow the difference between the sizes of object images produced through the compensated left and right distance vision to be reduced and the left and right images to be readily merged into a single image are thus provided.

Application Example 5

In the spectacle lenses described above, it is also desirable that the specifications of the left and right lenses on near vision are coordinately designed. In one form of the spectacle lenses, when the dioptric power of the near portion of the second lens is shifted toward the positive side with respect to the dioptric power of the near portion of the first lens, the object-side average surface power of the near portion of the second lens, the near portion of which has dioptric power shifted toward the positive side, is smaller than the object-side average surface power of the near portion of the first lens. Lenses that allow the difference between the sizes of object images produced through the compensated left and right near vision to be reduced and the left and right images to be readily merged into a single image are thus provided.

Application Example 6

Another form in which the specifications of the left and right lenses on near vision are coordinately designed is spectacle lenses configured as follows: when at least one of the first and second lenses has an object-side surface including the distance portion and the near portion having different magnitudes of average surface power, the object-side surface having different magnitudes of average surface power is so configured that when the dioptric power of the near portion is shifted toward the positive side with respect to the dioptric power of the distance portion, the object-side average surface power of the near portion is smaller than the object-side average surface power of the distance portion, whereas when the dioptric power of the near portion is shifted toward a negative side with respect to the dioptric power of the distance portion, the object-side average surface power of the near portion is greater than the object-side average surface power of the distance portion. Reducing the difference in magnification between the compensated distance vision and the compensated near vision of each of the lenses leads to lenses that allow the difference between the sizes of object images produced through the compensated left and right near vision to be reduced and the left and right images to be readily merged into a single image.

Application Example 7

In another aspect of the invention, the specifications of the left and right lenses on near vision are coordinately designed in association with the distance vision or independently thereof. That is, in spectacle lenses including first and second lenses, each of the first and second lenses including a distance portion and a near portion, the dioptric power of the near portion of the second lens is shifted toward a positive side with respect to the dioptric power of the near portion of the first lens, and object-side average surface power of the near portion of the second lens is smaller than object-side average surface power of the near portion of the first lens. In this way, a large difference in magnification will not occur between the left near vision and the right near vision.

Application Example 8

Another aspect of the invention is directed to spectacles including any of the spectacle lenses described above and a spectacle frame to which the spectacle lenses are attached. Spectacles that allow left and right images to be readily merged into a single image can thus be provided.

Application Example 9

Still another aspect of the invention is directed to a method for manufacturing spectacle lenses. The method includes:
(a) determining object-side average surface power of first and second lenses based on a spectacle prescription; and
(b) changing the object-side average surface power of at least one of the first and second lenses, when the magnitudes of power of the first and second lenses differ from each other in the spectacle prescriptions, in such a way that the difference in magnification between the first and second lenses is smaller than the difference in magnification between the first and second lenses based on the spectacle prescriptions.

According to the method for manufacturing spectacle lenses, the pair of left and right lenses are coordinately designed from the viewpoint of vision compensation. Spectacles that allow the difference in magnification between the compensated left vision and the compensated right vision to be reduced and left and right images to be readily merged into a single image can thus be provided.

Application Example 10

In the method for manufacturing spectacle lenses described above, the changing the average surface power in such a way that the magnification difference is reduced (step b) may include setting the object-side average surface power of the first lens that has power shifted toward a positive side to be smaller than object-side average surface power of the first lens having power shifted toward the positive side but determined based on the spectacle prescription of the first lens, and/or setting the object-side average surface power of second lens that has power shifted toward a negative side to be greater than object-side average surface power of the second lens having power shifted toward the negative side but determined based on the spectacle prescription of the second lens.

Application Example 11

In the method for manufacturing spectacle lenses described above, the changing the average surface power in such a way that the magnification difference is reduced (step b) may include setting the object-side average surface power of one of the first and second lenses that has power shifted toward a positive side to be smaller than object-side average surface power of the lens having power shifted toward the positive side but determined based on the spectacle prescription of the lens to the extent that the lens having power shifted toward the positive side remains a meniscus lens convex toward an object, and setting the object-side average surface power of one of the first and second lenses that has power shifted toward a negative side to be greater than object-side average surface power of the lens having power shifted toward the negative side but determined based on the spectacle prescription of the lens. When the object-side average surface power of the lens having power shifted toward the positive side is reduced, the resultant lens may not remain a meniscus lens convex toward an object in some cases. On the other hand, when the object-side average surface power of the lens having power shifted toward the negative side is increased, the curvature of the object-side surface of the lens becomes unnecessarily large, resulting in degradation in appearance. It is therefore desirable to minimize the object-side average surface power of the lens having power shifted toward the positive side so that the difference in magnification between the left and right lenses is reduced but to the extent that the lens remains a meniscus lens convex toward an object. To further reduce the difference in magnification between the left and right lenses, it is desirable to increase the object-side average surface power of the lens having power shifted toward the negative side.

Application Example 12

In the method for manufacturing spectacle lenses described above, it is typical that the power of the first lens is principal meridian power along a principal meridian of the first lens; the object-side average surface power of the first lens is average surface power in the direction along the principal meridian of the first lens; the power of the second lens is principal meridian power along a principal meridian of the second lens; and the object-side average surface power of the second lens is average surface power in the direction along the principal meridian of the second lens.

Application Example 13

Yet another aspect of the invention is directed to a method for manufacturing spectacle lenses formed of a pair of lenses for left and right eyes, each of the pair of lenses being a multifocal spectacle lens including a distance portion having dioptric power and a near portion having different dioptric power. The method includes:
(a) determining object-side average surface power of the distance portion of each of the pair of lenses based on a spectacle prescription; and
(b) when the difference in magnification between the distance portions of the pair of lenses is greater than a predetermined value, setting the object-side average surface power of the distance portion of one of the pair of lenses having dioptric power shifted toward a positive side to be smaller than object-side average surface power of the distance portion of the lens having dioptric power shifted toward the positive side but determined based on the spectacle prescription of the lens, or setting the object-side average surface power of the distance portion of one of the pair of lenses having dioptric power shifted toward a negative side to be greater than object-side average surface power of the distance portion of the lens having dioptric power shifted toward the negative side but determined based on the spectacle prescription of the lens.

According to the method for manufacturing spectacle lenses, the distance portions of the pair of left and right lenses are coordinately designed from the viewpoint of vision compensation. Spectacles that allow the difference in magnification between the compensated left distance vision and the compensated right distance vision to be reduced and left and right images to be readily merged into a single image can thus be provided.

Application Example 14

In the method for manufacturing spectacle lenses described above, the manufacturing method desirably further includes coordinately designing the near portions when the magnitudes of dioptric power by which the left near vision and the right near vision are compensated differ from each other in the spectacle prescriptions. That is, the manufacturing method desirably further includes:

(c) determining object-side average surface power of the near portion of each of the pair of lenses based on the spectacle prescription of the lens; and (d) coordinately designing the near portions of the pair of lenses when the magnitudes of dioptric power by which the left near vision and the right near vision are compensated differ from each other in the spectacle prescriptions.

According to the method for manufacturing spectacle lenses, the near portions of the pair of left and right lenses are coordinately designed from the viewpoint of vision compensation. Spectacles that allow the difference in magnification between the compensated left near vision and the compensated right near vision to be reduced and left and right images to be readily merged into a single image can thus be provided.

Application Example 15

In the method for manufacturing spectacle lenses described above, the coordinately designing the near portions may include, when the difference in magnification between the near portions of the pair of lenses is greater than a predetermined value, setting the object-side average surface power of the near portion of the lens having dioptric power shifted toward the positive side to be smaller than object-side average surface power of the near portion of the lens having dioptric power shifted toward the positive side but determined based on the spectacle prescription of the lens, or setting the object-side average surface power of the near portion of one of the pair of lenses having dioptric power shifted toward the negative side to be greater than object-side average surface power of the near portion of the lens having dioptric power shifted toward the negative side but determined based on the spectacle prescription of the lens.

Application Example 16

In the method for manufacturing spectacle lenses described above, the coordinately designing the near portions may include setting the object-side average surface power of the distance portion of at least one of the pair of lenses to be different from the object-side average surface power of the near portion of the one lens. The setting differently includes when the dioptric power of the near portion is shifted toward the positive side with respect to the dioptric power of the distance portion, setting the average surface power of the near portion to be smaller than the average surface power of the distance portion, whereas when the dioptric power of the near portion is shifted toward the negative side with respect to the dioptric power of the distance portion, setting the average surface power of the near portion to be greater than the average surface power of the distance portion.

Application Example 17

Still yet another aspect of the invention is directed to a spectacle lens designing apparatus including a unit that determines object-side average surface power of each of a pair of lenses based on a spectacle prescription and a unit that changes the object-side average surface power of at least one of the pair of lenses, when the magnitudes of power of the left and right lenses differ from each other in the spectacle prescription, in such a way that the difference in magnification between the pair of lenses is smaller than the difference in magnification between the pair of lenses based on the spectacle prescriptions. The apparatus may further include a unit that simulates the way a wearer views an object through the pair of lenses designed to reduce the magnification difference.

Application Example 18

Further another aspect of the invention is directed to a multifocal spectacle lens designing apparatus including a unit that determines object-side average surface power of a distance portion of each of a pair of lenses based on a spectacle prescription and a unit that coordinately designs the distance portions of the pair of lenses from the viewpoint of vision compensation when the magnitudes of dioptric power by which left distance vision and right distance vision are compensated differ from each other in the spectacle prescription. The coordinately designing unit may include a unit that when the difference in magnification between the distance portions of the pair of lenses is greater than a predetermined value, selects the object-side average surface power of the distance portion of one of the pair of lenses having dioptric power shifted toward a positive side to be smaller than object-side average surface power of the distance portion of the lens having dioptric power shifted toward the positive side but determined based on the spectacle prescription of the lens, or selects the object-side average surface power of the distance portion of one of the pair of lenses having dioptric power shifted toward a negative side to be greater than object-side average surface power of the distance portion of the lens having dioptric power shifted toward the negative side but determined based on the spectacle prescription of the lens.

Application Example 19

The apparatus described above preferably further includes a unit that simulates the way a wearer views an object through the pair of coordinately designed lenses and can show a user that the difference in magnification between the compensated left distance vision and the compensated right distance vision is reduced.

BRIEF DESCRIPTION OF THE DRAWINGS

The invention will be described with reference to the accompanying drawings, wherein like numbers reference like elements.

FIGS. 4A to 4C are tables summarizing values associated with lenses according to Comparative Example 1 (FIG. 4A), Example 1a (FIG. 4B), and Example 1b (FIG. 4C).

FIGS. 5A and 5B are tables summarizing values associated with lenses according to Comparative Example 2 (FIG. 5A) and Example 2 (FIG. 5B).

FIG. 7A is a plan view diagrammatically showing one of multifocal spectacle lenses according to a second embodiment, and FIG. 7B is a cross-sectional view of the one multifocal spectacle lens.

FIGS. 9A and 9B are tables summarizing values associated with lenses according to Example 3 (FIG. 9A) and Comparative Example 3 (FIG. 9B) in which far dioptric power is positive.

FIGS. 10A and 10B are tables summarizing values associated with lenses according to Example 4 (FIG. 10A) and Comparative Example 4 (FIG. 10B) in which far dioptric power is negative.

FIGS. 11A to 11C are tables summarizing values associated with lenses according to Example 5 (FIGS. 11A and 11B) and Comparative Example 5 (FIG. 11C) in which left near dioptric power and right near dioptric power differ from each other.

DESCRIPTION OF EXEMPLARY EMBODIMENTS

First Embodiment

Figure 1:
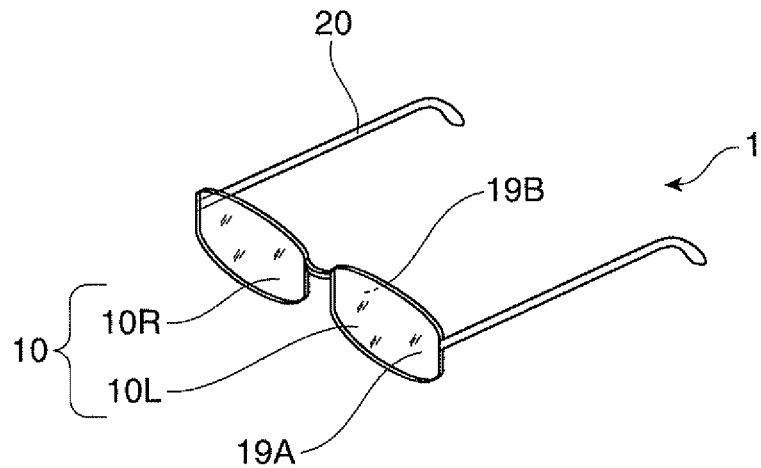
FIG. 1 is a perspective view showing an example of spectacles according to a first embodiment.
Figure 2B:
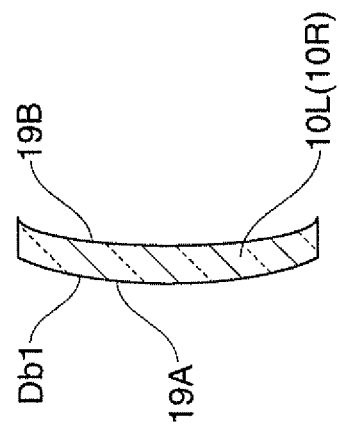
FIG. 2B is a cross-sectional view of the one spectacle lens.
Figure 2A:
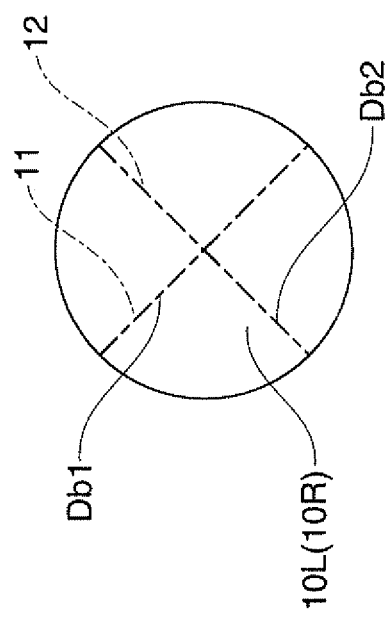
FIG. 2A is a plan view diagrammatically showing one of spectacle lenses according to the first embodiment.

FIG. 1 is a perspective view showing an example of spectacles according to a first embodiment. FIG. 2A is a plan view diagrammatically showing one of spectacle lenses according to the present embodiment. FIG. 2B is a cross-sectional view diagrammatically showing the one of the spectacle lenses according to the present embodiment. In the present embodiment, the left and right sides in the following description are the left and right sides viewed from a user (wearer, eyeball). In FIGS. 2A and 2B, the one lens is assumed to be a lens 10L for the left eye, but the one lens may alternatively be a lens 10R for the right eye. In the following description, the terms "one lens" and "the other lens" are intended to be used interchangeably (switchably) between the lens 10L for the left eye and the lens 10R for the right eye unless otherwise particularly specified.

Spectacles 1 according to the present embodiment include a pair of spectacle lenses (a pair of lenses, lens system, lens pair) 10, the lens 10L for the left eye and the lens 10R for the right eye, and a spectacle frame 20 to which the lenses 10L and 10R are attached. Each of the pair of left and right lenses 10L, 10R is a meniscus lens convex toward an object and has an object-side surface (convex surface) 19A and an eyeball-side surface (concave surface) 19B. Since the pair of left and right lenses 10L, 10R are basically configured in the same way, configurations common to the lenses 10L and 10R are described below with reference to the lens 10L for the left eye unless otherwise particularly specified.

The lens 10L is a single-vision spectacle lens and corrects (compensates) farsightedness or nearsightedness. The power (dioptric power) of the lens 10L is the sum of average surface power of the object-side surface 19A and average surface power of the eyeball-side surface 19B and expressed in a unit called dioptre (hereinafter referred to as D). The surface power is defined by the following equation:

$$\text{surface power} = (n-1) \times \rho \quad (1)$$

where ρ represents the curvature of the surface (reciprocal of the radius of curvature R of the surface or 1/R) and n represents the refractive index of the material of the lens. In particular, the surface power of the object-side surface is called a base curve.

There is a single-vision spectacle lens having a function of correcting not only farsightedness or nearsightedness but also astigmatism. To correct astigmatism, it has been known to design one of the two refraction surfaces 19A and 19B to have a cylindrical or toroidal shape. The lens 10L for correcting astigmatism therefore has two principal meridians, a first principal meridian 11 and a second principal meridian 12.

The following description will be made of a lens 10L having no astigmatism correcting function, that is, having only one principal meridian, the first principal meridian 11, unless otherwise particularly specified. In the lens 10L, object-side average surface power (base curve) Db1 is therefore average surface power along the first principal meridian 11 of the object-side surface 19A of the lens 10L.

The spectacle lenses 10 are manufactured based on a specification stating that the power (hereinafter sometimes referred to as dioptric power) of the lens 10L for the left eye is shifted toward the positive side with respect to the power of the lens 10R for the right eye. More specifically, when both eyes are corrected by positive dioptric power, the dioptric power of the lens 10L for the left eye is greater than that of the lens 10R for the right eye, whereas when both eyes are corrected by negative dioptric power, (the absolute value of) the dioptric power of the lens 10L for the left eye is smaller than that of the lens 10R for the right eye. Further, in the spectacle lenses 10, the object-side average surface power (base curve) Db1*l* of the lens 10L for the left eye is smaller than the base curve Db1*r* of the lens 10R for the right eye.

A Tscherning ellipse may be used as a mathematical solution for astigmatism removal. Based on a Tscherning ellipse, when the dioptric power (power) of the lens 10L for the left eye is shifted toward the positive side with respect to that of the lens 10R for the right eye, the base curve of the lens 10L for the left eye is greater than that of the lens 10R for the right eye.

On the other hand, the magnification M of a spectacle lens is expressed by the following equation:

$$M = Ms \times Mp \quad (2)$$

where Ms represents a shape factor, and Mp represents a power factor. Now, let n be the refractive index of the material of the lens, D be the base curve of the object-side surface of the lens, L be the distance from the apex of the eyeball-side surface of the lens (inner apex) to the eyeball, P (corresponding to dioptric power S) be the power at the inner apex (inner-apex power), and t be the central thickness of the lens. Mp and Ms are expressed as follows:

$$Ms = 1/(1 - D \times t/n) \quad (3)$$

$$Mp = 1/(1 - L \times P) \quad (4).$$

To evaluate Equations (3) and (4), the base curve D and the inner-apex power P are expressed in dioptre (D), and the thickness t and the distance L are expressed in meter (m).

Equation (2) is therefore rewritten as follows:

$$M = \{1/(1 - D \times t/n)\} \times \{1/(1 - L/P)\} \quad (5).$$

As seen from Equation (5), the magnification M is approximately inversely proportional to the product of the base curve D and the power P (dioptric power S). When the dioptric power of one of the left and right lenses differs from that of the other, the magnification M of the lens having dioptric power S shifted toward the positive side is smaller than that of the other lens. Further, when the base curve D is selected based on the Tscherning ellipse, the selected base curve D of the lens having dioptric power S shifted toward the positive side is greater than that of the other lens, and hence the difference in magnification M between the left and right lenses further increases.

Before spectacle lenses are selected, the states of the left and right eyes are checked, and specifications of the left and right lenses are so determined that the vision of the left and right eyes is appropriately compensated. Spectacles including the spectacle lenses, when worn by the user, thus correct the vision of the left and right eyes of the user in a satisfactory manner. On the other hand, when the vision of one of the left and right eyes differs from that of the other, the spectacle lenses compensate (correct) the vision of the eyes so that clear images are produced, but the sizes of the resultant images differ from each other and hence the left and right images are hardly merged into a single image but become double images or the sense of distance changes because the sizes of the images change when the wearer changes the viewing direction. It has been therefore found that the vision correction in related art instead causes a sense of discomfort.

In the spectacle lenses 10 of the present embodiment, the left and right lenses 10L, 10R are so designed and manufactured that they satisfy the specifications for compensating the vision of the left and right eyes and so coordinately designed from the viewpoint of vision compensation that the difference in magnification between the left and right lenses 10L, 10R is eliminated or reduced. To this end, in the spectacle lenses 10, the base curves Db1l and Db1r of the left and right lenses 10L, 10R are selected differently from the guidance of a Tscherning ellipse, specifically, oppositely thereto. The difference in the magnification M between the left and right lenses due to the difference in the dioptric power S between the left and right lenses can therefore be eliminated or reduced by changing the way the left and right base curves D are selected.

That is, when the dioptric power of one of the lenses is shifted toward the positive side with respect to that of the other lens, the difference in the magnification M between the one lens and the other lens can be reduced or eliminated by reducing the base curve Db1 of the one lens, the dioptric power of which is shifted toward the positive side, relative to the base curve Db1 of the other lens. Similarly, the difference in the magnification M between a pair of lenses can be eliminated or reduced by shaping the object-side surface (convex surface) of one lens having dioptric power shifted toward the positive side to be more shallowly curved (to have smaller curvature) and shaping the object-side surface (convex surface) of the other lens having dioptric power shifted toward the negative side to be more deeply curved (to have greater curvature).

In a spectacle lens for compensating astigmatism, the dioptric power along the first principal meridian 11 (first principal meridian power) differs from the dioptric power along the second principal meridian 12 (second principal meridian power). In a pair of lenses 10L and 10R that are both spectacle lenses for correcting astigmatism, the base curve Db1l along the first principal meridian 11 of one lens 10L, the base curve Db2l along the second principal meridian 12 of the one lens 10L, the base curve Db1r along the first principal meridian 11 of the other lens 10R, and the base curve Db2r along the second principal meridian 12 of the other lens 10R are therefore so selected that the base curves along the principal meridians of the lenses having dioptric power shifted toward the positive side with respect to the dioptric power along the first principal meridian 11 of the one lens 10L, the dioptric power along the second principal meridian 12 of the one lens 10L, the dioptric power along the first principal meridian 11 of the other lens 10R, and the dioptric power along the second principal meridian 12 of the other lens 10R are smaller. In this way, the pair of lenses 10L and 10R for compensating astigmatism can produce images having a small magnification difference through astigmatism-corrected vision.

On the other hand, selecting the base curves Db1 and/or Db2 differently from a Tscherning ellipse or oppositely thereto may not improve the optical performance of the left and right lenses 10L, 10R. A Tscherning ellipse-based method only works when the base curve of a spectacle lens is spherical, whereas introducing an aspheric surface allows the amount of aberrations of the spectacle lens to be greatly reduced. Further, too large an edge thickness (peripheral thickness) of each of the left and right lenses 10L, 10R can be reduced by increasing the refractive index of the material of the lenses. As described above, although a Tscherning ellipse is still an important guideline in spectacle lens design, several other specifications (methods) for reducing the amount of aberrations and solving other disadvantages have been provided to date. It is therefore possible not only to improve optical performance of a single lens but also to further enhance the performance as spectacle lenses by coordinately designing left and right lenses from the viewpoint of optical performance (vision compensation).

Figure 3:
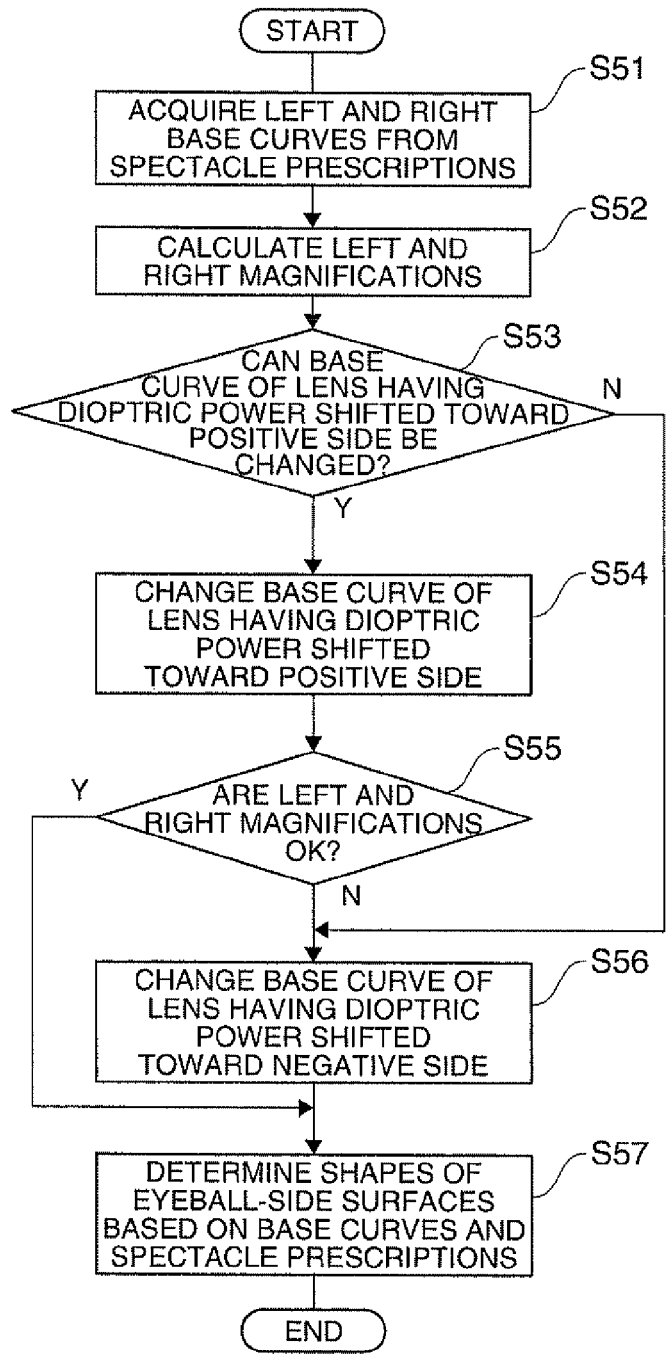
FIG. 3 is a flowchart for describing an example of a method for manufacturing spectacle lenses according to the first embodiment.

FIG. 3 is a flowchart showing an example of a method for manufacturing the spectacle lenses 10 according to the present embodiment. In step S51, the base curves (object-side average surface power) Db1l and Db1r of the left and right lenses 10L, 10R are first determined from the dioptric power described in spectacle prescriptions based on which the vision of the left and right eyes is corrected. In step S52, when the dioptric power described in the spectacle prescription based on which the right eye vision is corrected (compensated) differs from the dioptric power described in the spectacle prescription based on which the left eye vision is corrected, the magnifications of the pair of left and right lenses 10L, 10R are calculated.

In step S53, it is judged whether or not the base curve Db1 of the lens having dioptric power shifted toward the positive side can be changed. Since the spectacle lenses 10 are worn on the face of a wearer, each of the spectacle lenses 10 is preferably a meniscus lens convex toward an object. When the base curve Db1 of the lens having dioptric power shifted toward the positive side is reduced to adjust the magnification difference and obtain a predetermined dioptric power, the eyeball-side surface 19B possibly becomes convex toward the eyeball. In step S53, it is therefore judged not only whether or not the base curve Db1 of the lens having dioptric power shifted toward the positive side can be changed but also how much the base curve Db1 can be reduced when the base curve Db1 can be changed.

In step S54, the base curve of the lens having dioptric power shifted toward the positive side is changed. In the present embodiment, the base curve Db1l of the lens 10L for the left eye is set to be smaller than a base curve determined based on the spectacle prescription of the lens 10L. In step S55, the difference in magnification between the left and right lenses 10L, 10R is checked. When the magnification difference is sufficiently small or the magnification ratio is sufficiently close to "1", the base curves of the pair of left and right lenses 10L, 10R have been successfully adjusted.

On the other hand, when it is necessary to further reduce the magnification difference, the base curve of the lens having dioptric power shifted toward the negative side is changed in step S56. In the present embodiment, the base curve Db1r of the lens 10R for the right eye is set to be greater than a base curve determined based on the spectacle prescription of the lens 10R. After the base curves Db1l and Db1r of the pair of lenses 10L and 10R are determined, the thus determined base curves Db1*l* and Db1*r* and the spectacle prescriptions are used to determine the shapes of the eyeball-side surfaces 19B in step S57. Since the shapes of the surfaces 19A and 1913 of the left and right lenses 10L, 10R have thus been determined, the left and right lenses 10L, 10R are manufactured in a molding process or any other suitable process.

To reduce the difference in magnification between the pair of lenses 10L and 10R, both of the base curves Db1*l* and Db1*r* of the pair of lenses 10L and 10R may be changed or the base curve Db1*l* or Db1*r* of either of the lenses may be changed. When the base curve Db1*l* or Db1*r* of either of the lenses is changed, the lens having dioptric power shifted toward the positive side should remain a meniscus lens convex toward an object, as described above. Reducing only the base curve of the lens having dioptric power shifted toward the positive side results in insufficient reduction in the difference in magnification between the pair of lenses 10L and 10R in some cases. In this case, the magnification difference can be further reduced by increasing the base curve of the lens having dioptric power shifted toward the negative side, as described above.

On the other hand, the difference in magnification between the pair of lenses 10L and 10R can also be reduced by increasing only the base curve of the lens having dioptric power shifted toward the negative side. In this case, however, deviation of the increased base curve from a Tscherning ellipse increases, and too large a base curve adversely affects the appearance (good appearance) of the lens. In view of the fact described above, to reduce the difference in magnification between the pair of lenses 10L and 10R, the base curve of the lens having dioptric power shifted toward the positive side is set to be smaller than a base curve determined based on the spectacle prescription of the lens, and the base curve of the lens having dioptric power shifted toward the negative side is set to be greater than a base curve determined based on the spectacle prescription of the lens, whereby the deviation of the base curves of the lenses 10L and 10R from a Tscherning ellipse decreases. As a result, the lenses 10L and 10R can be so manufactured and provided that they excel not only in magnification difference and other optical performance but also in appearance.

Several examples of the thus manufactured lenses 10L and 10R will be presented below. Further, the lenses 10L and 10R will be compared with lenses manufactured by using a comparative method.

Example 1 and Comparative Example 1

FIG. 4A shows an example of lenses manufactured by using a comparative method (Comparative Example 1). FIG. 4B shows an example in which the magnification ratio is set at one by increasing the base curve Db1*l* of the lens 10L for the left eye having dioptric power (power) shifted toward the negative side (Example 1a). FIG. 4C shows an example in which the magnification ratio is set at one by reducing the base curve Db1*r* of the lens 10R for the right eye having dioptric power (power) shifted toward the positive side (Example 1b).

Specifications of the spectacle lenses according to Examples 1a and 1b and Comparative Example 1 are as follows: dioptric power S (power P) by which the right eye is compensated: +6.00 (D), distance (from the apex of the eyeball-side surface of the lens (inner apex) to the right eyeball) Lr: 0.012 (m), dioptric power S (power P) by which the left eye is compensated: +5.75 (D), distance (from the apex of the eyeball-side surface of the lens (inner apex) to the left eyeball) Ll: 0.012 (m), and the refractive index n of the material of the lens: 1.60.

In Comparative Example 1, the lenses are designed and manufactured based on a Tscherning ellipse.

In Comparative Example 1, the difference in magnification (magnification ratio, in this case) between the left and right lenses is 0.9943 as shown in FIG. 4A, whereas the magnification ratio between the left and right lenses can be reduced to 1.0000 in Example 1a shown in FIG. 4B and in Example 1b shown in FIG. 4C. Specifically, in the spectacle lenses according to Comparative Example 1 shown in FIG. 4A, the base curve Db1*r* (Db1*r*=7.5) of the lens for the right eye having dioptric power (power) shifted toward the positive side is greater than the base curve Db1*l* (Db1*l*=7.25) of the lens for the left eye. That is, the lens having dioptric power shifted toward the negative side has a shallow convex surface (base curve), whereas the lens having dioptric power shifted toward the positive side has a deep convex surface (base curve).

In contrast, in the spectacle lenses according to Example 1a shown in FIG. 4B, the base curve Db1*r* (Db1*r*=7.5) of the lens for the right eye having dioptric power (power) shifted toward the positive side is smaller than the base curve Db1*l* (Db1*l*=8.614) of the lens for the left eye. That is, the lens having dioptric power shifted toward the negative side has a deep convex surface (base curve), whereas the lens having dioptric power shifted toward the positive side has a shallow convex surface (base curve).

Further, in the spectacle lenses according to Example 1b shown in FIG. 4C, the base curve Db1*r* (Db1*r*=6.192) of the lens for the right eye having dioptric power (power) shifted toward the positive side is smaller than the base curve Db1*l* (Db1*l*=7.250) of the lens for the left eye. However, the lens for the right eye, in which the dioptric power is 6 D and the base curve Db1*r* is 6.192 D, has a substantially flat eyeball-side surface 19B. In Example 1a, the difference in magnification between the left and right lenses 10L, 10R is eliminated by adjusting the base curve Db1*l* of the lens 10L having dioptric power shifted toward the negative side. On the other hand, in Example 1b, the difference in magnification between the left and right lenses 10L, 10R is eliminated by adjusting the base curve Db1*r* of the lens 10R having dioptric power shifted toward the positive side.

As described above, the magnification difference can be eliminated or reduced by adjusting the base curve of one of the left and right lenses 10L, 10R. In this case, however, the lens having dioptric power shifted toward the positive side may not be a meniscus lens convex toward an object, or the lens having dioptric power shifted toward the negative side may have too large a base curve and hence a bad appearance. Eliminating magnification difference by adjusting both the base curves of the left and right lenses 10L, 10R is therefore a preferred embodiment.

Reducing the difference in magnification between the left and right lenses 10L, 10R reduces the difference in size between left and right images produced through the compensated vision of the user who wears the spectacles 1 including the lenses 10L and 10R. In this case, the left and right images have the same size. Spectacle lenses that allow left and right images produced by the spectacles to be readily merged into a single image can thus be provided.

Example 2 and Comparative Example 2

FIG. 5A shows a comparative example in which the lens 10L for the left eye and the lens 10R for the right eye differ from each other (Comparative Example 2), and FIG. 5B shows an example in which the difference in magnification between the lenses 10L and 10R designed based on the same spectacle prescription is reduced (Example 2).

Spectacle specifications in Example 2 and Comparative Example 2 are as follows: dioptric power Sr (power P) by which the right eye is compensated: +4.00 (D), distance (from the apex of the eyeball-side surface of the lens (inner apex) to the right eyeball) Lr: 0.012 (m), dioptric power Sl (power P) by which the left eye is compensated: +3.00 (D) distance (from the apex of the eyeball-side surface of the lens (inner apex) to the left eyeball) Ll: 0.012 (m), and the refractive index n of the material of the lenses: 1.50.

In Comparative Example 2 shown in FIG. 5A, the magnification ratio between the left and right lenses is 0.9839, whereas the magnification ratio between the left and right lenses can be reduced to 0.9864 in Example 2 shown in FIG. 5B. Specifically, in the spectacle lenses according to Comparative Example 2 shown in FIG. 5A, the left and right base curves Db1$l$, Db1$r$ are the same (Db1$l$=Db1$r$=5.50). On the other hand, in the spectacle lenses according to Example 2 shown in FIG. 5B, the base curve Db1$l$ of the lens 10L for the left eye having dioptric power shifted toward the negative side (Db1$l$=6.500) is so adjusted to be greater than the base curve Db1$r$ of the lens 10R for the right eye. As a result, the lens having dioptric power shifted toward the positive side has a shallow convex surface (base curve), whereas the lens having dioptric power shifted toward the negative side has a deep convex surface (base curve).

Figure 6:
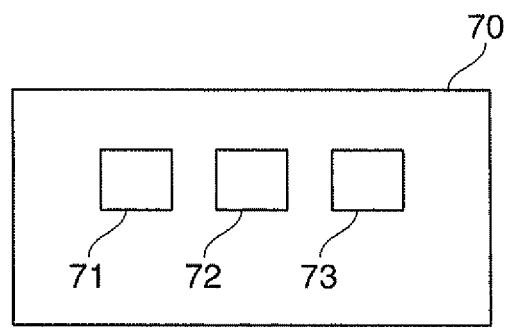
FIG. 6 shows a schematic configuration of an example of a spectacle lens designing apparatus according to the first embodiment.

FIG. 6 shows a schematic configuration of an example of a spectacle lens designing apparatus 70. The designing apparatus 70 includes first to third units (functions) 71 to 73. The first unit 71 determines the base curves of a pair of lenses based on spectacle prescriptions.

The second unit 72, when the dioptric power by which the left vision is compensated differs from the dioptric power by which the right vision is compensated in spectacle prescriptions, coordinately designs the pair of lenses 10L and 10R in such a way that the magnification difference is reduced by changing the base curves Db1$l$ and Db1$r$ of the lenses 10L and 10R. One of the base curves Db1$l$ and Db1$r$ of the left and right lenses 10L, 10R may be changed, or both of the base curves may be changed. Further, when the spectacle prescriptions include astigmatism compensation, each of the pair of lenses 10L and 10R has dioptric power and base curves Db1$l$ and Db1$r$ along first and second principal meridians. The second unit 72 therefore changes any or all of the base curves Db2$l$, Db2$r$, Db1$r$, and Db2$r$ along the first and second principal meridians of the pair of lenses 10L and 10R to reduce the magnification difference along the first and second principal meridians of the left and right lenses 10L, 10R.

The third unit 73 simulates the way a wearer (user) views an object through the pair of lenses 10L and 10R designed to eliminate or reduce the magnification difference. An example of the unit 73 is an image display apparatus that allows the wearer along with a head-mounted display or any other suitable device to virtually experience compensated vision with the difference in magnification between the left and right lenses reduced. The designing apparatus 70 therefore allows the user in a spectacle shop to experience a state in which the user wears spectacles 1 including the coordinately designed left and right lenses 10L, 10R. That is, the spectacle lenses 10 (lenses 10L and 10R) according to the present embodiment can not only readily merge left and right images into a single image but also reduce the amount of distortion and movement of the images. Wearing the spectacle lenses 10 therefore allows the wearer to experience a more comfortable field of view.

Second Embodiment

FIG. 7A is a plan view diagrammatically showing one of multifocal spectacle lenses according to a second embodiment. FIG. 7B is a cross-sectional view diagrammatically showing the one multifocal spectacle lens according to the present embodiment. In FIGS. 7A and 7B, the one lens is assumed to be a lens 10L for the left eye, but the one lens may alternatively be a lens 10R for the right eye. In the following description, the terms "one lens" and "the other lens" are intended to be used interchangeably (switchably) between the lens 10L for the left eye and the lens 10R for the right eye unless otherwise particularly specified. Further, in the following description of the present embodiment, the same components as those in the embodiment described above have the same reference characters, and no description of these components will be made.

Spectacles 1 according to the present embodiment include multifocal spectacle lenses (progressive multifocal lenses (lens system, lens pair)) 10 as a pair of spectacle lenses, the left lens 10L for the left eye and the right lens 10R for the right eye, instead of the spectacle lenses according to the first embodiment and a spectacle frame 20 to which the lenses 10L and 10R are attached. Each of the lenses 10L and 10R as a pair of left and right progressive multifocal lenses (progressive-power lenses) basically has a meniscus shape convex toward an object but part of the lens may have in some cases a shape of a convex lens or a shape close thereto depending on addition diopter. Each of the pair of left and right lenses 10L, 10R therefore has an object-side surface (convex surface) 19A and an eyeball-side surface (concave surface) 19B. Since the pair of left and right lenses 10L, 10R are basically configured in the same way, configurations common to the lenses 10L and 10R are described below with reference to the lens 10L for the left eye unless otherwise particularly specified.

The lens 10L has a distance portion 13 having dioptric power (power), near portion 14 having different dioptric power (power), and a progressive portion 15 that connects the distance portion 13 to the near portion 14. More specifically, the distance portion 13, which is disposed in an upper portion of the lens 10L, is a viewing area that allows the wearer to view a far object, and the near portion 14, which is disposed in a lower portion of the lens 10L and has dioptric power (power) different from that of the distance portion 13, is a viewing area that allows the wearer to view a near object. Further, the progressive portion 15 in the lens 10L connects the distance portion 13 to the near portion 14 in such a way that the power continuously changes from the distance portion 13 to the near portion 14.

The dioptric power (power) of each of the distance portion 13, the near portion 14, and the progressive portion 15 is the sum of average surface power of the object-side surface 19A and average surface power of the eyeball-side surface 19B and expressed in a unit called dioptre (hereinafter referred to as D). The surface power is defined by Equation (1) including the following parameters: p representing the curvature of the surface (reciprocal of the radius of curvature R of the surface or 1/R) and n represents the refractive index of the material of the lens. In particular, the surface power of the object-side surface is called a base curve.

In the following description, the average surface power of each of the distance portion 13 and the near portion 14 is surface power in the vicinity of a principal line of fixation 16 unless otherwise particularly specified. That object-side average surface power (base curve) Dbf of the distance portion 13 is average surface power in the vicinity of the principal line of fixation 16 of the object-side surface 19A in distance portion 13, and object-side average surface power (base curve) Dbn of the near portion 14 is average surface power in the vicinity of the principal line of fixation 16 of the object-side surface 19A in the near portion 14.

The multifocal spectacle lenses 10 are manufactured based on a specification stating that the dioptric power of the distance portion 13 (hereinafter referred to as far dioptric power) of the lens 10L for the left eye is shifted toward the positive side with respect to the far dioptric power of the lens 10R for the right eye. More specifically, when both eyes are corrected by positive far dioptric power, the far dioptric power of the lens 10L for the left eye is greater than that of the lens 10R for the right eye, whereas when both eyes are corrected by negative far dioptric power, (the absolute value of) the far dioptric power of the lens 10L for the left eye is smaller than that of the lens 10R for the right eye. Further, in the multifocal spectacle lenses 10, the object-side base curve Dbfl of the distance portion 13 of the lens 10L for the left eye is smaller than the object-side base curve Dbfr of the distance portion 13 of the lens 10R for the right eye.

A Tscherning ellipse may be used as a mathematical solution for astigmatism removal. Based on a Tscherning ellipse, when the far dioptric power of the distance portion 13 of the lens 10L for the left eye is shifted toward the positive side with respect to that of the lens 10R for the right eye, the base curve of the distance portion 13 of the lens 10L for the left eye is greater than that of the distance portion 13 of the lens 10R for the right eye.

In recent years, before spectacle lenses are selected, the states of the left and right eyes are checked, and specifications of the left and right lenses are so determined that the vision of the left and right eyes is appropriately compensated. Further, in a multifocal lens, specifications for distance vision and near vision are determined separately from each other. The multifocal lenses, when worn by the user, thus correct the vision of the left and right eyes of the user in a satisfactory manner. On the other hand, when the vision of one of the left and right eyes differs from that of the other, or when only the far or near vision of one of the left and right eyes differs from that of the other, the multifocal spectacle lenses compensate (correct) the vision of the eyes so that clear images are produced, but the sizes of the resultant images differ from each other and hence the left and right images are hardly merged into a single image but become double images or the sense of distance changes because the sizes of the images change when the wearer changes the viewing direction. It has been therefore found that the vision correction in related art instead causes a sense of discomfort.

In the multifocal spectacle lenses 10 of the present embodiment, the left and right lenses 10L, 10R are so designed and manufactured that they satisfy the specifications (spectacle specifications, spectacle prescriptions) for compensating the vision of the left and right eyes and so coordinately designed from the viewpoint of vision compensation that the difference in magnification between the left and right lenses 10L, 10R is eliminated or reduced. To this end, in the multifocal spectacle lenses 10, the base curves Dbfl and Dbfr of the distance portions 13 of the left and right lenses 10L, 10R are selected differently from the guidance of a Tscherning ellipse, specifically, oppositely thereto. The difference in the magnification M between the left and right lenses due to the difference in the dioptric power S between the left and right lenses can therefore be eliminated or reduced by changing the way the left and right base curves D are selected. That is, to design the magnifications M of the distance portions 13 of the pair of lenses 10L and 10R to approach each other, and when the far dioptric power of one of the lenses is shifted toward the positive side with respect to that of the other, the difference in the magnification M between the distance portions 13 of the one lens and the other lens can be reduced or eliminated by reducing the base curve Dbf of the one lens, the far dioptric power of which is shifted toward the positive side, relative to the base curve Dbf of the other lens. Similarly, the difference in the magnification M between a pair of lenses can be eliminated or reduced by shaping the object-side surface (convex surface) of one lens having far dioptric power shifted toward the positive side to be more shallowly curved (to have smaller curvature) and shaping the object-side surface (convex surface) of the other lens having far dioptric power shifted toward the negative side to be more deeply curved (to have greater curvature).

In the multifocal spectacle lenses 10, the difference in magnification between the near portions 14 of the pair of lenses 10L and 10R can be similarly eliminated or reduced by coordinately designing the near portions 14 of the pair of lenses 10L and 10R in association with the distance portions 13 or independently thereof. A specification (method) for coordinately designing the near portions 14 from the viewpoint of vision compensation is to design the near portions 14 independently of the distance portions 13. That is, when the dioptric power of the near portion 14 (hereinafter referred to as near dioptric power) of one of the lenses is shifted toward the positive side with respect to the near dioptric power of the other lens, the difference in magnification between the near portions 14 of the left and right lenses can be reduced by setting the base curve (object-side average surface power) Dbnl of the near portion 14 of the one lens, for example, the lens for the left eye, to be smaller than the base curve Dbnr of the near portion 14 of the other lens (lens for the right eye).

Another specification (method) for coordinately designing the near portions 14 of the left and right lenses 10L, 10R is to design the near portions 14 assuming that the difference in magnification between the distance portions 13 of the left and right lenses 10L, 10R has already been reduced. That is, in each of the lenses 10L and 10R, designing the near portion 14 in such a way that the difference in magnification between the distance portion 13 and the near portion 14 is reduced allows the difference in magnification between the near portions 14 of the left and right lenses 10L, 10R, because the difference in magnification between the distance portions 13 of the left and right lenses 10L, 10R has already been reduced.

The specification (method) described above works only when the distance portion 13 and the near portion 14 of each of the lenses have different magnitudes of dioptric power, and reducing the difference in magnification between the distance portion 13 and the near portion 14, in most cases, results in a situation in which the base curve of the distance portion 13 does not agree with the base curve of the near portion 14, or the distance portion 13 and the near portion 14 of the object-side surface 19A of at least one of the lenses 10L and 10R have a base curve Dbf and a base curve Dbn different from each other.

For the object-side surface (object-side surface of the lens) 19A having different base curves, when the near dioptric power is shifted toward the positive side with respect to the far dioptric power, the difference in magnification between the near portion 14 and the distance portion 13 can be reduced by setting the base curve Dbn of the near portion 14 to be smaller than the base curve Dbf of the distance portion 13. On the other hand, when the near dioptric power is shifted toward the negative side with respect to the far dioptric power, the difference in magnification between the near portion 14 and the distance portion 13 can be reduced by setting the base curve Dbn of the near portion 14 to be greater than the base curve Dbf of the distance portion 13. As a result, the difference in magnification between the near portions 14 of the left and right lenses 10L, 10R can be reduced.

As described above, selecting the base curves Dbf and/or Dbn differently from a Tscherning ellipse or oppositely thereto may not improve the optical performance of the left and right lenses 10L, 10R. A Tscherning ellipse-based method only works when base curves of a spectacle lens are spherical, whereas introducing an aspheric surface allows the amount of aberrations of the spectacle lens to be greatly reduced. Further, too large an edge thickness (peripheral thickness) of each of the left and right lenses 10L, 10R can be reduced by increasing the refractive index of the material of the lenses.

Figure 8:
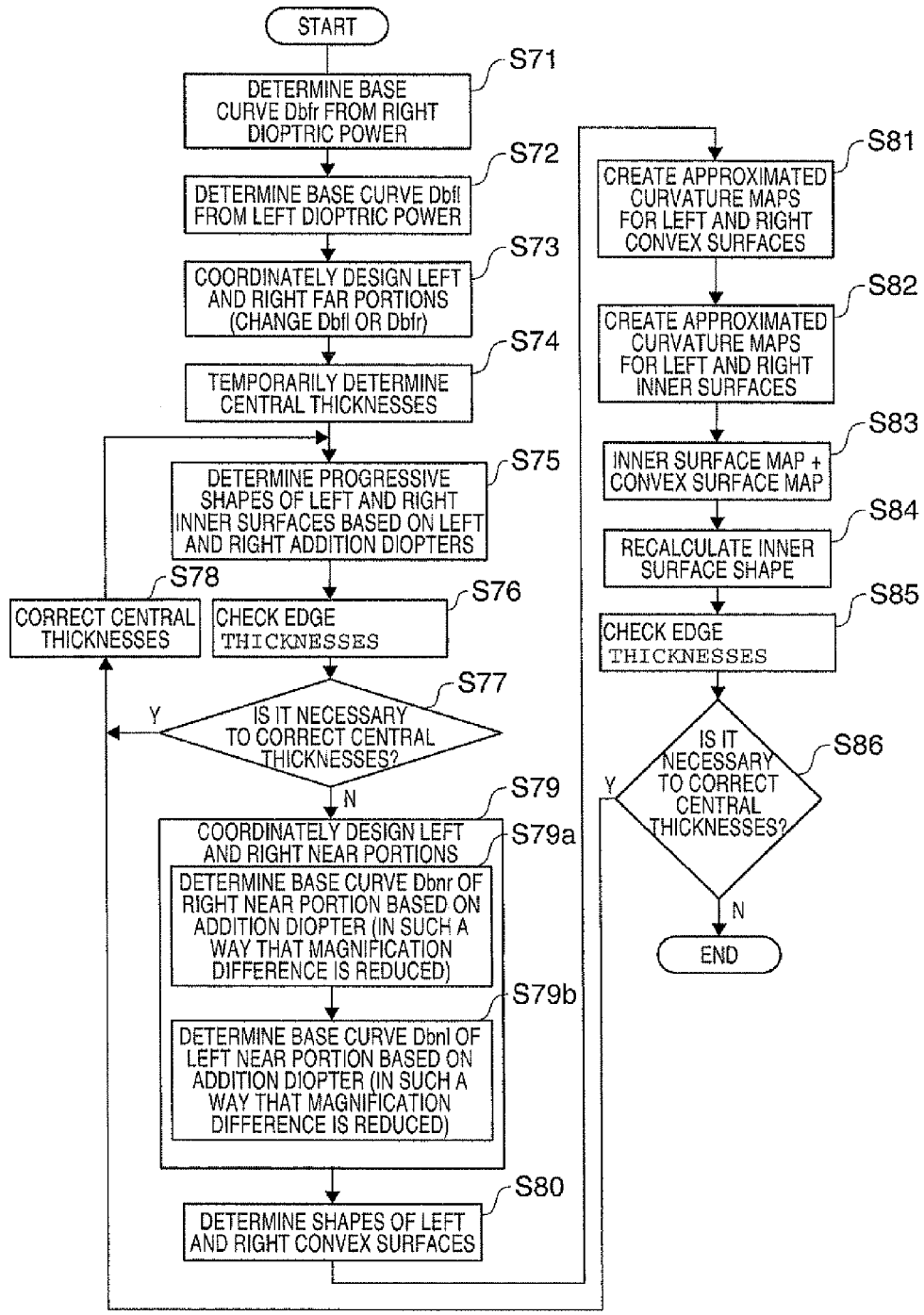
FIG. 8 is a flowchart for describing an example of a method for manufacturing the multifocal spectacle lenses according to the second embodiment.

FIG. 8 is a flowchart showing an example of a method for manufacturing the multifocal spectacle lenses 10 according to the present embodiment. In step S71, the base curve Dbfr of the distance portion 13 (object-side average surface power of distance portion 13) of the lens 10R for the right eye is first determined from the dioptric power described in a spectacle prescription based on which the distance vision of the right eye is compensated. In step S72, the base curve Dbfl of the distance portion 13 (object-side average surface power of distance portion 13) of the lens 10L for the left eye is similarly determined from the dioptric power described in a spectacle prescription based on which the distance vision of the left eye is compensated.

In step S73, when the dioptric power described in the spectacle prescription based on which the distance vision of the right eye is compensated differs from the dioptric power described in the spectacle prescription based on which the distance vision of the left eye is compensated, the distance portions 13 of the pair of lenses 10L and 10R are coordinately designed. Specifically, the difference in magnification between the distance portions 13 of the pair of lenses 10L and 10R is determined from the left and right base curves Dbfl, Dbfr having been determined in steps S71 and S72, and when the magnification difference is greater than a predetermined value, the left or/and right base curves Dbfl, Dbfr is changed.

More specifically, in step S73, when the dioptric power of the distance portion 13 of the lens 10L of the pair of lenses is shifted toward the positive side with respect to the dioptric power of the distance portion 13 of the lens 10R, the base curve Dbfl of the lens 10L having dioptric power shifted toward the positive side is set to be smaller than a base curve determined based on the spectacle prescription of the lens 10L, and/or the base curve Dbfr of the lens 10R having dioptric power shifted toward the negative side is set to be greater than a base curve determined based on the spectacle prescription of the lens 10R. The difference in magnification between the distance portions 13 of the lenses 10L and 10R is thus reduced by changing either or both of the base curve Dbfl of the left lens 10L and the base curve Dbfr of the right lens 10R.

Whether or not either or both of the base curve Dbfl of the left lens 10L and the base curve Dbfr of the right lens 10R are changed is determined by several conditions. One of the most important conditions is that changing the base curve of either of the distance portions 13 does not result in a convex eyeball-side surface 19B but preferably results in a concave eyeball-side surface 19B.

In many cases, the base curve Dbfl of the lens 10L and the base curve Dbfr of the lens 10R are so selected from base curves of lenses listed by a lens manufacturer that the selected base curves have required magnitudes of far dioptric power by which wearer's eyes are corrected. It is therefore rare that the selected base curves perfectly agree with those obtained based on a Tscherning ellipse even in an individual lens design stage although agreeing therewith on the whole. It is therefore useful to change the base curve Dbfl of the lens 10L and/or the base curve Dbfr of the lens 10R in such a way that deviation from those obtained based on a Tscherning ellipse is minimized.

In step S74, the central thickness of each of the lenses 10L and 10R is temporarily determined, and in step S75, the progressive shape of the inner surface 19B (shape of progressive refraction surface) of each of the lenses 10L and 10R is determined based on addition diopter Add. At this point, the edge thickness of each of the lenses is checked in step S76. When it is judged in step S77 that it is necessary to correct the central thicknesses, they are corrected in step S78.

In step S79, when the dioptric power described in the spectacle prescription based on which the near vision of the left eye is compensated differs from the dioptric power described in the spectacle prescription based on which the near vision of the right eye is compensated, the near portions 14 of the left and right lenses 10L, 10R are coordinately designed. In this description, the difference in magnification between the distance portion 13 and the near portion 14 of each of the left and right lenses 10L, 10R is adjusted in steps S79a and S79b assuming that the difference in magnification between the distance portions 13 of the left and right lenses 10L, 10R is eliminated or reduced. In step S79, the near portions 14 of the left and right lenses 10L, 10R may alternatively be coordinately designed from the viewpoint of vision compensation independently of the distance portions 13 of the left and right lenses 10L, 10R, as described above.

In the present embodiment, the base curve Dbnr of the near portion 14 (object-side average surface power of near portion 14) of the lens 10R for the right eye is first determined based on addition diopter Add in step S79a. In this process, the curve of the convex surface 19A in the near portion 14 of the lens 10R is so selected that the magnification of the near portion 14 approaches that of the distance portion 13. When the addition diopter Add is positive, that is, when the dioptric power of the near portion 14 is shifted toward the positive side with respect to the dioptric power of the distance portion 13, the base curve Dbnr of the near portion 14 is selected to be smaller than the base curve Dbfr of the distance portion 13. On the other hand, when the addition diopter Add is negative, that is, when the dioptric power of the near portion 14 is shifted toward the negative side with respect to the dioptric power of the distance portion 13, the base curve Dbnr of the near portion 14 is selected to be greater than the base curve Dbfr of the distance portion 13.

In step S79b, the base curve Dbnl of the near portion 14 (average surface power of near portion 14) of the lens 10L for the left eye is similarly determined based on addition diopter Add in such a way that the magnification of the near portion 14 approaches that of the distance portion 13.

In step S80, the shapes of the convex surfaces 19A of the lenses 10L and 10R are determined based on the base curves Dbfl and Dbfr of the distance portions 13 and the base curves Dbnl and Dbnr of the near portions 14 of the lenses 10L and 10R. In each of the lenses 10L and 10R, the dioptric power of the distance portion 13 differs from that of the near portion 14. Except a case where the addition diopter Add is very small, the base curve Dbf of the distance portion 13 therefore differs from the base curve Dbn of the near portion 14 so that the difference in magnification between the distance portion 13 and the near portion 14 is reduced. The convex surfaces 19A of the lenses 10L and 10R provided at this point of time are aspheric surfaces including the distance portion 13 and the near portion 14 having different base curves.

It is therefore necessary to change the inner progressive shapes, which were determined in step S75 assuming that the base curves are spherical, in such a way that the inner progressive shapes conform to the shapes of the aspheric surfaces having the different base curves determined in step S80. In step S81, an approximated curvature map for the convex (aspheric) surface 19A of each of the lenses 10L and 10R is first created. In step S82, an approximated curvature map for the inner surface (progressive refraction surface) 19B of each of the lenses 10L and 10R is next created.

An approximated curvature map shows z coordinates at predetermined points across a lens surface distributed at intervals (by using lattice points) fine enough to reproduce a smooth surface. When a functional surface is designed, an approximated curvature map, in which the z coordinates of a large number of points across the surface are digitized so that points between the large number of points can be interpolated, allows a designer to handle the entire functional curved surface in an approximately numerical manner. Japanese Patent No. 3,852,116 entitled to the present applicant, for example, describes that an approximated curvature map is used to combine several functional surfaces into a single surface. The z coordinate is a coordinate defined based on xy coordinates in a plane defined when the lens is viewed from an object or an eyeball and representing the lens thickness perpendicular to the xy plane. The z coordinate can be defined, for example, to be positive on the eyeball side.

In the present embodiment, creating an approximated curvature map for the object-side aspheric surface 19A of each of the lenses 10L and 10R in step S81 enables digitization of the surface shape (curvature) for reducing the difference in magnification between the distance portion and the near portion of each of the left and right lenses. On the other hand, in step S82, the surface shape (curvature) of the progressive refraction surface 19B of each of the left and right lenses having spherical base curves is digitized. In step S83, the sum of the approximated curvature map for the convex surface (aspheric surface) 19A and the approximated curvature map for the inner surface (progressive refraction surface) 19B is calculated, and the shape of the inner surface 19B is recalculated based on the sum in step S84. A new inner progressive refraction surface 19B having predetermined dioptric power in each area across the inner surface is thus produced with respect to the aspheric surface 19A.

As described above, in the present embodiment, approximated curvature maps for two surfaces are used not to combine the functions of the surfaces but to correct the function of one of the surfaces with respect to that of the other surface, whereby the other surface, which is in the present embodiment the inner progressive surface providing a predetermined function with respect to the object-side aspheric surface, is produced. In this way, progressive multifocal spectacle lenses having progressive surfaces with little difference in magnification between left and right lenses and between far and near portions can be manufactured and provided. It is also possible to provide the inner progressive surfaces 19B with a refraction capability for compensating astigmatism by combining approximated curvature maps.

The edge thicknesses are checked again in step S85. When it is judged in step S86 that the central thickness correction is necessary, the control returns to step S75. When it is judged in step S86 that no central thickness correction is necessary, the design of the lenses 10L and 10R is completed.

Several examples of the thus manufactured lenses 10L and 10R will be presented below. Further, the lenses 10L and 10R will be compared with lenses manufactured by using a comparative method.

Example 3 and Comparative Example 3

FIG. 9A shows an example of multifocal spectacle lenses 10L and 10R for the left and right eyes including distance portions 13 having positive dioptric power (far dioptric power) and manufactured by coordinately designing the distance portions 13 by using the method described above (Example 3). FIG. 9B shows an example of multifocal spectacle lenses 10L and 10R manufactured by using a comparative method (Comparative Example 3).

Specifications of the progressive multifocal spectacle lenses according to Example 3 and Comparative Example 3 are as follows: dioptric power Sr (power 2) by which the distance vision of the right eye is compensated: +3.00 (D), addition diopter Addr: 2.00 (D), distance (from the apex of the eyeball-side surface of the lens (inner apex) to the eyeball) Lr: 0.012 (m), dioptric power Sl (power 2) by which the distance vision of the left eye is compensated: +4.00 (D), addition diopter Addl: 2.00 (D), distance Ll: 0.012 (m), and the refractive index n of the material of the lenses: 1.662.

In Comparative Example 3, the lenses are designed and manufactured based on a Tscherning ellipse.

As shown in FIGS. 9A and 9B, the difference in magnification (magnification ratio, in this case) between the distance portions 13 of the left and right lenses is 1.019 in Comparative Example 3 shown in FIG. 9B, whereas the magnification ratio between the distance portions 13 of the left and right lenses can be reduced to 1.010 in Example 3 shown in FIG. 9A. Specifically, in the spectacle lenses according to Comparative Example 3 shown in FIG. 9B, the base curve Dbfl (Dbfl=7.0) of the lens for the left eye having far dioptric power shifted toward the positive side is greater than the base curve Dbfr (Dbfr=6.0) of the lens for the right eye. That is, the lens having far dioptric power shifted toward the negative side has a shallow convex surface (base curve), whereas the lens having far dioptric power shifted toward the positive side has a deep convex surface (base curve).

In contrast, in the spectacle lenses according to Example 3 shown in FIG. 9A, the base curve Dbfl (Dbfl=6.0) of the lens for the left eye having far dioptric power shifted toward the positive side is smaller than the base curve Dbfr (Dbfr=7.0) of the lens for the right eye. That is, the lens having far dioptric power shifted toward the negative side has a deep convex surface (base curve), whereas the lens having far dioptric power shifted toward the positive side has a shallow convex surface (base curve).

Reducing the difference in magnification between the distance portions reduces the difference in size between left and right images produced through the compensated distance vision of the user who wears spectacles 1 including the lenses 10L and 10R. Spectacle lenses that allow left and right images produced through distance vision to be readily merged into a single image can thus be provided.

Example 4 and Comparative Example 4

FIG. 10A shows an example of multifocal spectacle lenses 10L and 10R for the left and right eyes including distance portions 13 having negative dioptric power (far dioptric power) and manufactured by coordinately designing the distance portions 13 by using the method described above (Example 4). FIG. 10B shows an example of multifocal spectacle lenses 10L and 10R manufactured by using a comparative method (Comparative Example 4).

Specifications of the progressive multifocal spectacle lenses according to Example 4 and Comparative Example 4 are as follows: dioptric power Sr (power P) by which the distance vision of the right eye is compensated: −4.00 (D), addition diopter Addr: 2.00 (D), distance Lr: 0.012 (m), dioptric power Sl (power P) by which the distance vision of the left eye is compensated: −4.25 (D), addition diopter Addl: 2.00 (D), distance Ll: 0.012 (m), and the refractive index n of the material of the lenses: 1.498.

As shown in FIGS. 10A and 10B, the magnification ratio between the distance portions 13 of the left and right lenses is 0.997 in Comparative Example 4 shown in FIG. 10B, whereas the magnification ratio between the distance portions 13 of the left and right lenses can be reduced to 0.998 in Example 4 shown in FIG. 10A. Specifically, in the spectacle lenses according to Comparative Example 4 shown in FIG. 10B, the base curve Dbfr (Dbfr=2.5) of the lens for the right eye having far dioptric power shifted toward the positive side is equal to the base curve Dbfl (Dbfl=2.5) of the lens for the left eye.

In contrast, in the spectacle lenses according to Example 4 shown in FIG. 10A, the base curve Dbfr (Dbfr=2.5) of the lens for the right eye having far dioptric power shifted toward the positive side is smaller than the base curve Dbfl (Dbfl=4.0) of the lens for the left eye. That is, the lens having far dioptric power shifted toward the negative side has a deep convex surface (base curve), whereas the lens having far dioptric power shifted toward the positive side has a shallow convex surface (base curve).

Example 5 and Comparative Example 5

FIG. 11A shows an example of multifocal spectacle lenses 10L and 10R for the left and right eyes including distance portions 13 having the same magnitude of dioptric power (far dioptric power) and near portions 14 having different magnitudes of dioptric power (near dioptric power) due to different magnitudes of addition diopter and manufactured by coordinately designing the near portion 14 of the lenses 10L and 10R for the left and right eyes (Example 5). FIG. 11E shows an example of spectacle multifocal lenses 10L and 10R for the left and right eyes manufactured by coordinately designing near portions 14 to the extent that the base curves thereof agree with each other. FIG. 11C shows an example of spectacle multifocal lenses 10L and 10R manufactured by using a comparative method (Comparative Example 5).

Specifications of the progressive multifocal spectacle lenses according to Example 5 and Comparative Example 5 are as follows: dioptric power Sr (power P) by which the distance vision of the right eye is compensated: +2.00 (D), addition diopter Addr: 2.00 (D), distance Lr: 0.012 (m), dioptric power Sl (power P) by which the distance vision of the left eye is compensated: +2.00 (D), addition diopter Addl: 3.00 (D), distance Ll: 0.012 (m), and the refractive index n of the material of the lenses: 1.60.

In Comparative Example 5 shown in FIG. 11C, the magnification ratio between the near portions 14 of the left and right lenses is 1.015, whereas the magnification ratio between the near portions 14 of the left and right lenses can be reduced to 1.011 in Example 5 shown in FIG. 11A. Further, the magnification ratio between the near portions 14 of the left and right lenses can be reduced to 1.013 in Example 5 shown in FIG. 11B.

Specifically, in the spectacle lenses according to Comparative Example 5 shown in FIG. 11C, the base curve Dbnl (Dbnl=6) of the near portion 14 of the lens for the left eye having near dioptric power (5 D) shifted toward the positive side is greater than the base curve Dbnr (Dbnr=5) of the near portion 14 of the lens for the right eye having near dioptric power (4 D) shifted toward the negative side. Further, since each of the lenses is designed as a spherical lens in Comparative Example 5, the base curve Dbfl of the distance portion 13 of the lens 10L for the left eye is equal to the base curve Dbnl of the near portion 14 of the lens 10L for the left eye, and the base curve Dbfr of the distance portion 13 of the lens 10R for the right eye is equal to the base curve Dbnr of the near portion 14 of the lens 10R for the right eye. As a result, the distance portions 13 of the left and right lenses actually have different magnifications although the distance portions 13 have the same dioptric power.

In contrast, in the spectacle lenses according to Example 5 shown in FIG. 11A, the base curve Dbnl (Dbnl=6) of the near portion 14 of the lens for the left eye having near dioptric power shifted toward the positive side is smaller than the base curve Dbnr (Dbnr=5) of the near portion 14 of the lens for the right eye having near dioptric power shifted toward the negative side. That is, the lens having near dioptric power shifted toward the negative side has a deep convex surface (base curve), whereas the lens having near dioptric power shifted toward the positive side has a shallow convex surface (base curve). Since the left and right near portions 14 are coordinately designed independent of the distance portions 13, the left and right distance portions 13 have the same dioptric power and hence the same base curve, whereby no magnification difference occurs.

As described above, the left and right lenses 10L, 10R according to Example 5 are so coordinately designed that the magnifications through the compensated near vision provided by the left and right near portions 14 agree with or approach each other. Spectacle lenses that allow left and right images produced through near vision to be readily merged into a single image can thus be provided. Alternatively, the base curves of the near portions 14 of the left and right lenses 10L, 10R are selected independently of the base curves of the distance portions 13 of the left and right lenses 10L, 10R by coordinately designing the left and right near portions 14 independent of the left and right distance portions 13. As a result, the object-side surface 19A of the lens 10R for the right eye has an aspheric surface including the distance portion 13 and the near portion 14 having different base curves, whereas the object-side surface 19A of the lens 10L for the left eye has a spherical surface including the distance portion 13 and the near portion 14 having the same base curve. Further, the difference in magnification between the left and right distance portions 13 is eliminated in this case.

In Example 5 described above, the base curve of the near portion 14 of the lens 10L for the left eye can also be so selected that the difference in magnification between the distance portion 13 and the near portion 14 of the lens 10L for the left eye is further reduced. It is further possible to select the base curve of the near portion 14 of the lens 10R for the right eye in such a way that the difference in magnification between the distance portion 13 and the near portion 14 of the lens 10R for the right eye is further reduced. Spectacles 1 including the thus manufactured left and right lenses 10L, 10R, which magnify left and right images of a far or near object produced by the spectacles 1 by substantially the same amount, allows the left and right images to be quickly merged into a single image. The spectacles 1 can therefore produce an image (through compensated vision) with little movement between left and right sides and through far and near vision. The spectacles 1 can also produce a clear image (through compensated vision) with little sense of discomfort through far and near vision.

Figure 12:
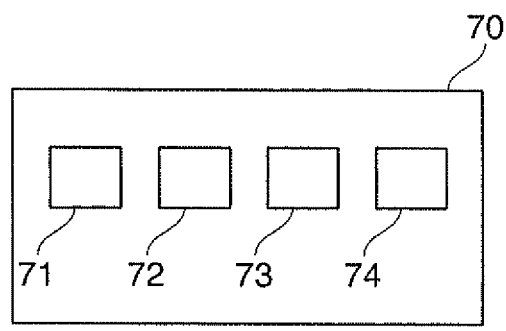
FIG. 12 shows a schematic configuration of an example of a multifocal spectacle lens designing apparatus according to the second embodiment.

FIG. 12 shows a schematic configuration of an example of a multifocal spectacle lens designing apparatus 70 according to the present embodiment. The designing apparatus 70 includes first to fourth units (functions) 71 to 74. The first unit 71 determines the base curves of a pair of lenses based on spectacle prescriptions.

The second unit 72, when the dioptric power by which the left distance vision is compensated differs from the dioptric power by which the right distance vision is compensated in spectacle prescriptions, coordinately designs distance portion 13 of the pair of lenses 10L and 10R from the viewpoint of vision compensation, specifically, in such a way that the magnification difference is reduced. The third unit 73, when the dioptric power by which the left near vision is compensated differs from the dioptric power by which the right near vision is compensated in spectacle prescriptions, coordinately designs near portions 14 of the pair of lenses 10L and 10R from the viewpoint of vision compensation, specifically, in such a way that the magnification difference is reduced. A method for coordinately designing the distance portions 13 and a method for coordinately designing the near portions 14 can be any one of the examples described above or any combination thereof. For example, when the difference in magnification between the left and right distance portions 13 is greater than a predetermined value, the second unit 72 sets the base curve Dbf of the distance portion 13 of one of the pair of lenses 10L and 10R, the lens having dioptric power shifted toward the positive side, to be smaller than a base curve determined based on the spectacle prescription of the lens, or sets the base curve Dbf of the distance portion 13 of one of the pair of lenses 10L and 10R, the lens having dioptric power shifted toward the negative side, to be greater than a base curve determined based on the spectacle prescription of the lens.

The fourth unit 74 simulates the way a wearer (user) views an object through the pair of lenses 10L and 10R configured in such a way that the distance portions 13 and/or the near portions 14 of the left and right lenses 10L, 10R are coordinately designed. An example of the unit 74 is an image display apparatus that allows the wearer along with a head-mounted display or any other suitable device to virtually experience compensated vision with the difference in magnification between the left and right lenses reduced. The designing apparatus 70 therefore allows the user in a spectacle shop to experience a state in which the user wears spectacles 1 including the coordinately designed left and right lenses 10L, 10R. That is, the multifocal spectacle lenses 10 (lenses 10L and 10R) according to the present embodiment can not only readily merge left and right images into a single image but also reduce the amount of distortion and movement of the images. Wearing the multifocal spectacle lenses 10 therefore allows the wearer to experience a more comfortable field of view.

The present embodiment has been described with reference to progressive (progressive-power) multifocal spectacle lenses, but the invention is not limited to progressive multifocal lenses. The invention is also applicable to bifocal lenses, trifocal lenses further having intermediate dioptric power, and other lenses.

What is claimed is:

1. Spectacle lenses comprising:
a first lens comprising a distance portion and a near portion; and
a second lens comprising a distance portion and a near portion, wherein
the first lens and the second lens are progressive lenses whose distance portion and near portion have different dioptric powers, and
a dioptric power of the distance portion of the second lens is larger than a dioptric power of the distance portion of the first lens, and an object-side average surface power of the distance portion of the second lens is smaller than an object-side average surface power of the distance portion of the first lens.

2. The spectacle lenses according to claim 1, wherein a dioptric power of the near portion of the second lens is larger than a dioptric power of the near portion of the first lens, and an object-side average surface power of the near portion of the second lens is smaller than an object-side average surface power of the near portion of the first lens.

3. The spectacle lenses according to claim 1, wherein
at least one of the first lens and the second lens has an object-side surface whose distance portion and near portion have different average surface powers, and
when the dioptric power of the near portion is larger than the dioptric power of the distance portion, the object-side average surface power of the near portion is smaller than the object-side average surface power of the distance portion, whereas when the dioptric power of the near portion is smaller than the dioptric power of the distance portion, the object-side average surface power of the near portion is greater than the object-side average surface power of the distance portion.

4. Spectacle lenses comprising:
a first lens comprising a distance portion and a near portion; and
a second lens comprising a distance portion and a near portion, wherein
the first lens and the second lens are progressive lenses whose distance portion and near portion have different dioptric powers, and
a dioptric power of the near portion of the second lens is larger than a dioptric power of the near portion of the first lens, and an object-side average surface power of the near portion of the second lens is smaller than an object-side average surface power of the near portion of the first lens.

5. A spectacles comprising:
a first lens comprising a distance portion and a near portion;
a second lens comprising a distance portion and a near portion; and
a spectacle frame to which the first lens and the second lens are attached, wherein
a dioptric power of the distance portion of the second lens is larger than a dioptric power of the distance portion of the first lens, and
an object-side average surface power of the distance portion of the second lens is smaller than an object-side average surface power of the distance portion of the first lens.

6. A spectacles comprising:
a first lens comprising a distance portion and a near portion;
a second lens comprising a distance portion and a near portion; and
a spectacle frame to which the first lens and the second lens are attached, wherein
a dioptric power of the near portion of second lens is larger than a dioptric power of the near portion of the first lens, and
an object-side average surface power of the near portion of the second lens is smaller than an object-side average surface power of the near portion of the first lens.

* * * * *